United States Patent [19]

Peterson

[11] Patent Number: 5,319,691
[45] Date of Patent: Jun. 7, 1994

[54] SELF LOCKING NUT FOR FUEL ASSEMBLY TIE RODS

[75] Inventor: Peter A. Peterson, San Ramon, Calif.
[73] Assignee: General Electric Company, San Jose, Calif.
[21] Appl. No.: 88,960
[22] Filed: Jul. 12, 1993
[51] Int. Cl.$^5$ ............................................. G21C 3/32
[52] U.S. Cl. ............................... 376/446; 411/435; 376/261
[58] Field of Search ............... 376/446, 434, 444, 445, 376/261; 8/10; 976/DIG. 68, DIG. 65; 29/243.522; 411/435

[56] References Cited

U.S. PATENT DOCUMENTS

| | | | |
|---|---|---|---|
| 800,574 | 5/1905 | Herzog | 411/435 |
| 812,294 | 5/1905 | Reed | 411/435 |
| 4,038,137 | 7/1977 | Pugh | 376/446 |
| 4,094,558 | 6/1978 | Christiansen | 308/3 R |
| 4,166,313 | 9/1979 | Walton | 29/243.5 |
| 4,219,386 | 8/1980 | Osborne et al. | 376/434 |
| 4,560,532 | 12/1985 | Barry et al. | 376/434 |
| 4,625,554 | 12/1986 | Lanzoni | 73/581 |
| 4,764,340 | 8/1988 | Lui et al. | 376/434 |
| 4,963,318 | 10/1990 | Johansson et al. | 376/446 |

Primary Examiner—Behrend E. Harvey
Assistant Examiner—Meena Chelliah
Attorney, Agent, or Firm—J. S. Beulick

[57] ABSTRACT

A method and an apparatus for locking the tie rods to block rotation relative to either the upper or lower tie plates utilizing the required fuel bundle channel. A conventional lock nut is provided for threading to the upper threaded end of the tie rods. This lock nut has attached extending wings, these wings when rotated interfering with a placed fuel bundle channel. In installation to the fuel bundle, and assuming that the tie rod has been fully threaded to the lower tie plate, the winged lock nut is rotated overlying the upper tie plate to cause full engagement of the upper tie plate to the tie rods. In such fastening, the winged lock nuts are rotated to an angle that provides no interference with the subsequently placed channel. Thereafter, and when the channel is placed, the channel interference with the rotational path of the wings of the lock nut and thus prevents relative rotation between the tie rod and winged lock nut. The fastening of the wings to the lock nut leaves portions of the hex surface of the lock nut exposed. Thus when bundle disassembly is required, only removal of the channel followed by conventional counter or unthreading rotation of the winged lock nut with sufficient force to overcome the locking characteristic of the nut is required. Consequently, disassembly for inspection of an irradiated fuel bundle assembly is facilitated.

6 Claims, 2 Drawing Sheets

SELF LOCKING NUT FOR FUEL ASSEMBLY TIE RODS

This invention relates to nuclear fuel bundles and the requirement that in such nuclear fuel bundles so-called "tie rods" be locked in their threaded relationship to upper and lower tie plates. More particularly, a conventional lock nut is provided with nut wings which move in interference with the fuel bundle channel to effect locking of the tie rods with respect to both the upper and lower tie plates.

BACKGROUND OF THE INVENTION

Nuclear fuel bundles are held together by tie rods. These tie rods having threaded engagement with the upper tie plate and lower tie plate of the fuel bundle. Beside contributing to the overall nuclear steam generation of the fuel bundles, the tie rods function mechanically in two ways. First, they maintain the fuel bundles as a unitary assembly. Secondly, they permit disassembly of the fuel bundles for inspection of the individual fuel rods interior of the fuel bundle during reactor outages. Accordingly, there is disclosed an improved method and apparatus for assuring that the tie rods and tie plates remain locking the fuel bundle into a unitary assembly.

In order to understand this invention, the construction of a fuel bundle will first be discussed. Secondly, operation of the fuel bundle will be briefly set forth. Finally existing practice in the disassembly and inspection of such fuel bundles will be set forth. Once this has been done, the invention herein and its advantages can be fully understood.

Fuel bundles for boiling water nuclear reactors include a plurality of side-by-side vertically upstanding sealed fuel rods, these fuel rods containing the fuel. In so far as the mechanical integrity of the fuel bundle is concerned, the fuel rods are divided into two classes. First, there is a class of fuel rods that is merely captured between the upper and lower tie plate within the fuel bundle These are the "ordinary" rods. Secondly, there is a class of fuel "tie rods" that attached through threaded engagement to the lower tie plate and through a threaded nut to the upper tie plate. These are the so-called "tie rods" which in effect tie the fuel bundle into a unitary assembly Over simplifying the construction of a nuclear fuel bundle, the lower tie plate functions to support the fuel rods and threads in engagement to typically eight tie rods. The upper tie plate—together with the lower tie plate—traps the ordinary fuel rods in vertical upstanding relation and ties to the tie rods at threaded nuts. Spacers are placed at regular vertical intervals to maintain designed spacing of the fuel rods for maximum nuclear efficiency. So-called water rods are placed at central locations in the fuel bundle and filled with water to improve the nuclear characteristics of the fuel bundle through improved neutron moderation. When all of these components are assembled together by securing the tie rods to the upper and lower tie plates, a nuclear fuel bundle which is a discrete separately handled unit of fuel for a boiling water nuclear reactor is created.

The fuel bundles must under no circumstance come apart during operation of the boiling water nuclear reactor. This being the case, elaborate precautions are taken to make sure that the threaded attachment of the tie rods does not come apart. The major precaution taken is the so-called locking tab at the top of the fuel bundle. These locking tabs fit over adjacent paired tie rods on the upper side of the upper tie plate and are held between the upper tie plate on the bottom and the fastening nuts on the top. The function of these locking tabs is relatively easy to understand.

First, the tie rods each have a slot at their respective upper end plugs. These slots mate with corresponding protruding nubs within the holes in the fastening tabs that extend around the tie rod end plugs. Remembering that each fastening tab fits around at least two tie rods, the tab itself cannot rotate. Further, when the nub fits into the slot in the tie rod, the tie rod cannot rotate relative to the locking tab and hence cannot rotate relative to the lower tie plate.

The upper tie plate is fastened to the threaded upper end of the tie rods. A nut is used which threads over the tie rod at the upper end and compresses the upper tie plate onto a spring between the end of the tie rod and a hole in the upper tie plate. Once this nut is in place, securing the nut against inadvertent rotation is required.

Securing the nut to the upper end of the tie rod occurs through strips or tangs coming up from the fastening tabs. These tangs are bent to fit against the sides of the hex nut utilized to fasten the upper tie plate. Since the fastening tabs cannot rotate, and the tangs from the fastening tabs contacting the sides of the hex nut prevent the nuts from rotation, the nuts fastening the upper tie plate are effectively locked in place. Thus, inadvertent disassembly of the tie rods, tie plates, and fuel bundle components held together by the tie rods and tie plates cannot occur.

All fuel bundles in boiling water nuclear reactors have a fuel bundle channel placed over the assembled fuel bundle. This channel may or may not be replaced with the nuclear fuel bundle; channels frequently are utilized for at least a second cycle, even though the fuel bundle within the channel has been replaced.

The fuel bundle channel is important when it comes to the operation of the fuel bundle. Specifically, the channel surrounds the fuel rods from the vicinity of the lower tie plate to the vicinity of the upper tie plate. It thus helps each fuel bundle to have an exclusive steam generating flow path which is separate from both the immediately surrounding core bypass region (which is liquid water moderator for improved nuclear performance) and the steam generating flow path through all remaining fuel bundles. In operation, water moderator enters the channel by passing through the lower tie plate and around the fuel rods. Water and generated steam leave the fuel bundle at the top of the channel typically by passage through the upper tie plate.

Boiling water nuclear reactors operate for specific periods of time. Thereafter, they are taken off line, depressurized, and serviced at intervals herein called "outages." During such outages, ⅓ to 1/5 of their respective fuel bundles are replaced. At the same time, inspection of other fuel bundles can be required to occur. And when such inspection occurs, the fuel bundles need to be disassembled. Given the locking tabs now in use, this disassembly is not convenient.

Once the fuel bundles have been within a nuclear reactor for a full cycle, they are the source of radiation. This being the case, disassembly and inspection of the fuel bundles must occur under a shielding water layer on the order of at least six feet of depth. Thus, all tools utilized function remotely under a water depth usually exceeding six feet.

In order to disassemble the fuel bundles, the upper tie plates must be removed. First, the tangs of the locking tabs in contact with the side of the hex nuts are bent out of contact with the sides of the nuts. Thereafter, the nuts are loosened. Finally, the locking tabs are lifted and discarded. Where the fuel bundle is reassembled after inspection, this process is reversed with the discarded locking tabs being replaced.

From the standpoint of reactor servicing, these required and laborious steps present two difficulties. This effort is time consuming, taking about 20 minutes. Reactors when off line are extremely expensive, costing hundreds of thousands of dollars per hour in lost utility revenue. Simply stated, time added in disassembly and reassembly is money lost in revenue.

Secondly, and more importantly, although all disassembly operations are done over a holding pool where any radiation is minimal, it is required by both regulation and safety that all exposure to such radiation be kept as low as reasonably achievable. Accordingly, the scheme for locking of the tie rods according to this invention has been developed.

SUMMARY OF THE INVENTION

A method and apparatus for locking the tie rods to block rotation relative to either the upper or lower tie plates utilizing the required fuel bundle channel is disclosed. A conventional lock nut is provided for threading to the upper threaded end of the tie rods. This lock nut has attached extending wings, these wings when rotated interfering with a placed fuel bundle channel. In installation to the fuel bundle, and assuming that the tie rod has been fully threaded to the lower tie plate, the winged lock nut is rotated overlying the upper tie plate to cause full engagement of the upper tie plate to the tie rods. In such fastening, the winged lock nuts are rotated to an angle that provides no interference with the subsequently placed channel. Thereafter, and when the channel is placed, the channel interferes with the rotational path of the wings of the lock nut and thus prevents relative rotation between the tie rod and winged lock nut. The fastening of the wings to the lock nut leaves portions of the hex surface of the lock nut exposed. Thus when bundle disassembly is required, only removal of the channel followed by conventional counter or unthreading rotation of the winged lock nut with sufficient force to overcome the locking characteristic of the nut is required. Consequently, disassembly for inspection of an irradiated fuel bundle assembly is facilitated.

DESCRIPTION OF THE PREFERRED EMBODIMENT

Figure 1:
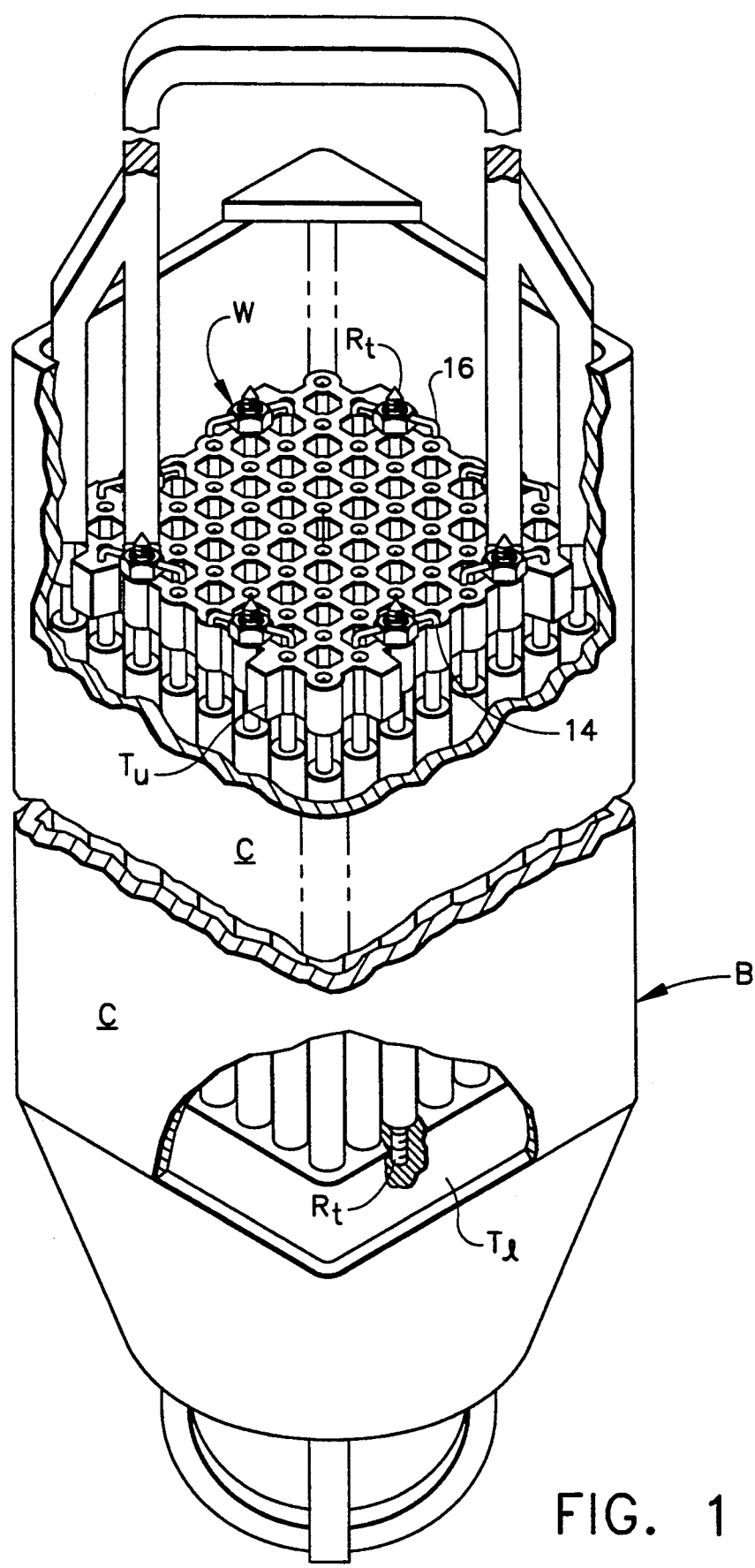
FIG. 1 is a perspective view of a fuel bundle with the central section broken away illustrating the attachment of a tie rod to the upper and lower tie plate and showing the lock nut with wings adjacent the channel walls at the tie rods.

Referring to FIG. 1, a fuel bundle B is shown having upper tie plate $T_u$, lower tie plate $T_l$ with fuel rods R extending therebetween. As is standard, a tie rod $R_t$ threads at lower tie plate $T_l$. The improvement of this invention is illustrated. Tie rod $R_t$ has a Winged lock nut W securing tie rod $R_t$ to upper tie plate $T_u$. Further, channel C is shown lowered about the fuel bundle, it being remembered that the fuel bundle proper may or may not include the channel when initially received at the reactor.

Figure 2:
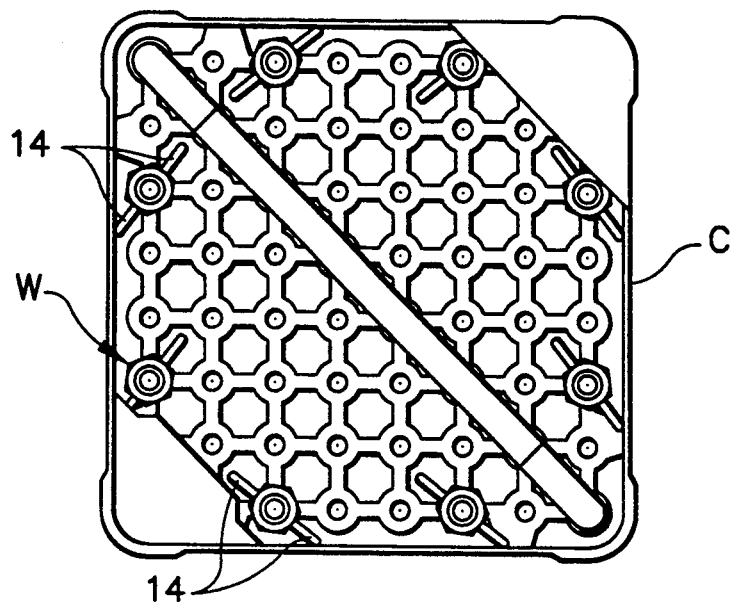
FIG. 2 is a top plan view of the fuel bundle and channel illustrating the placement of the channel and its interference with the rotation of the wings of the lock nut to cause locking of the tie rods in place.

Referring to FIG. 2, it will be seen that the winged lock nut W has the path of its wings 14 swinging in interference with channel C.

Also, it can be seen that these wings 14 are downward curved at surfaces 16. Thus if the wings have some interference with channel C, contact between wings 14 and surface 16 will cause rotation of winged lock nut W to a position of non-interference.

Figure 3:
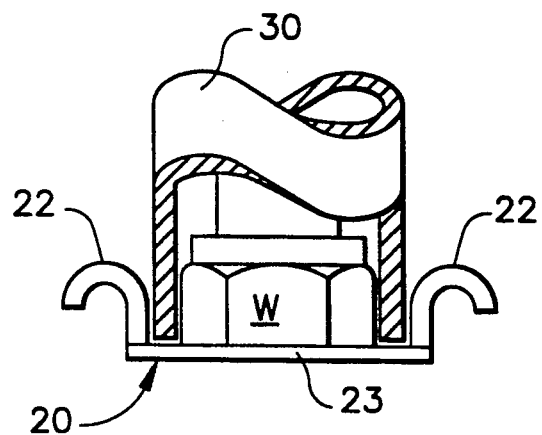
FIG. 3 is side elevation view of a lock nut and wings having a flat washer connection therebetween; and, FIG. 4 is a perspective view of lock nut and wings having an overlying conventional socket for conventional removal of the lock nut from the tie rod ends.
Figure 4:
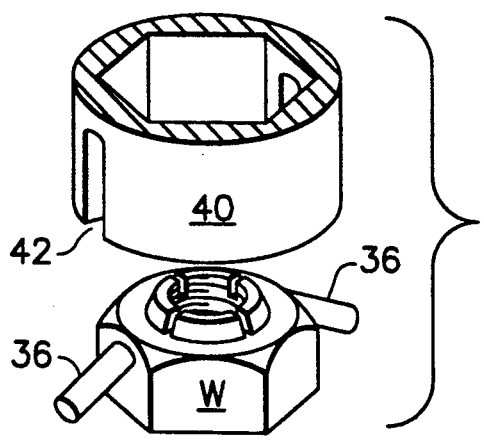

Two additional embodiments can be seen in FIGS. 3 and 4.

FIG. 3 illustrates winged lock nut W fastened at the bottom to washer 20. Washer 20, at a radial separation from the bottom of winged lock nut W, includes bent wire wings 22. The interval of radial separation is sufficient to allow socket 30 to screw and unscrew lock nut W.

FIG. 4 illustrates an alternate embodiment in which winged lock nut W has paired wings 36 fastened to opposite hex sides of winged lock nut W. A portion of a socket 40 having slots 42 for accommodating wings 36 is shown overlying winged lock nut W.

It will be understood that the winged lock nut W fastened to the top of a tie rod $R_t$ has interference with the channel. This interference has two effects.

First, the locking properties of winged lock nut W prevent rotation of that nut relative to the upper tie plate $T_u$. Release of the upper tie plate cannot occur.

Second, the locking properties of winged lock nut W prevent rotation of tie rod $R_t$. This being the case, tie rod $R_t$ rotation relative to the lower tie plate is prevented. Thus, where a lock nut is usually utilized for simple locking of a nut to a threaded shaft, the interference of the winged lock nut W with the channel both locks the nut to the tie rod at the upper end as well as locking the tie rod in threaded connection to the lower tie plate as well.

What is claimed is:

1. In a fuel bundle having:
    a plurality of vertically upstanding fuel rods for capture between upper and lower tie plates;
    a plurality of vertically upstanding tie rods located at the periphery of said upper tie plate, each said tie rod having a threaded lower end for engagement to said lower tie plate and having a threaded upper end for engagement to a nut to capture said upper tie plate;
    a lower tie plate having a plurality of threaded apertures for receiving the threaded lower ends of tie rods;
    an upper tie plate having an aperture for permitting said tie rods at said upper threaded end to extend through said aperture and capture said upper tie plate to said tie rods by a nut threaded to said upper tie rod end;

said upper tie plate placed over said threaded upper ends of said tie rods to enable a nut threaded to said upper tie rod end to capture said upper tie plate; and, nuts threaded over said upper plate onto said upper threaded ends of said tie rods to hold said upper tie plate to said tie rods and capture said fuel rods between said tie plates; and, a fuel bundle channel passed around said fuel rods, tie rods, and upper tie plate whereas define a confined flow path upper and lower tie plates, the improvement whereas said nut is a lock nut having at least one wing extending radially from said lock nut, said wing having sufficient dimension to define a radial path of interference with said fuel bundle channel upon placement of said channel about said fuel bundle, and said lock nut with said at least one wing being rotated to a position of non-interference with said channel.

2. The fuel bundle of claim 1 and wherein:

said lock nut is a hex nut and said wing fastens to said nut to leave portions of said hex nut exposed for threading said nut with respect to said tie rod.

3. The fuel bundle of claim 2 and wherein:

said hex nut includes a pair opposite wings.

4. In a process of securing tie rods to tie plates in a fuel bundle having:

a plurality of vertically upstanding fuel rods for capture between upper and lower tie plates;

a plurality of vertically upstanding tie rods located at the periphery of said upper tie plate, each said tie rod having a threaded lower end for engagement to said lower tie plate and having a threaded upper end for engagement to a nut to capture said upper tie plate;

a lower tie plate having a plurality of threaded apertures for receiving the threaded lower ends of tie rods;

an upper tie plate having an aperture for permitting said tie rods at said upper threaded end to extend through said aperture and capture said upper tie plate to said tie rods by a nut threaded to said upper tie rod end;

said upper tie plate placed over said threaded upper ends of said tie rods to enable a nut threaded to said upper tie rod end to capture said upper tie plate; and, nuts threaded over said upper plate onto said upper threaded ends of said tie rods to hold said upper tie plate to said tie rods and capture said fuel rods between said tie plates; and, a fuel bundle channel for passage around said fuel rods, tie rods, and upper tie plate to define a confined flow path around said fuel rods and tie rods substantially between said upper and lower tie plates, the process of securing tie rods to tie plates comprising the steps of:

providing a lock nut for threading to said upper end of said tie rods;

providing to said lock nut with least one wing extending radially from said lock nut, said wing having sufficient dimension to define a radial path of interference with said fuel bundle channel upon placement of said channel about said fuel bundle;

rotating said lock nut with said at least one wing to a position to secure said upper tie plate with said wing in a position of non-interference with said channel; and placing said channel over said fuel bundle to restrict said wing and attached lock nut from rotation.

5. The process of securing tie rods to tie plates in a fuel bundle according to claim 4 and wherein said rotating step includes:

providing said wing to said lock nut at the base of said nut to expose at least a portion of said outside surface of said lock nut; and, providing a socket to engage said lock nut;

engaging said socket to said lock nut; and, rotating said socket to thread said lock nut to the upper end of said tie rods.

6. The process of securing tie rods to tie plates in a fuel bundle according to claim 4 and wherein said rotating step includes:

providing said wing to said nut at a hex surface of said nut to expose at least remaining portions of said outside surface of said nut;

providing a socket to engage said nut; and, slotting said socket to enable said nut to pass into said slot and avoid said wing;

engaging said socket to said lock nut; and, rotating said socket to thread said lock nut to the upper end of said tie rods.

* * * * *